Charles W. Russell & Niel Clifford, Lamp Burner.
No. 72683
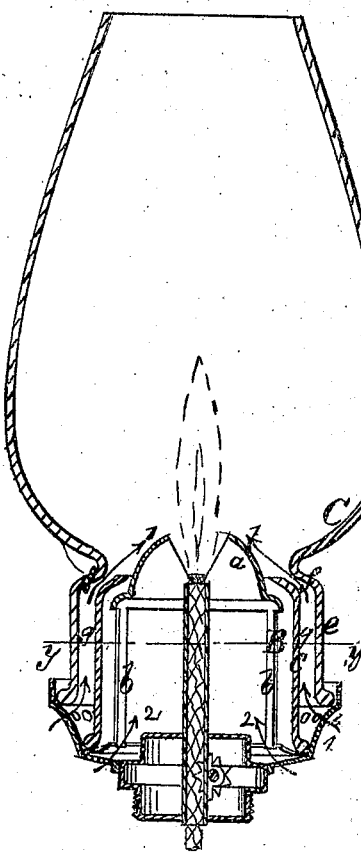
PATENTED
DEC 24 1867
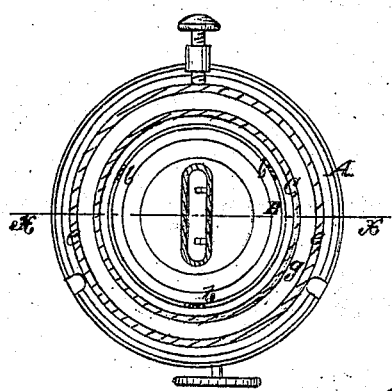
Witnesses:
Theo. Fische
Wm. Trewin
Inventors
Chas. H. Russell
Niel Clifford
Per Munn & Co
Attorneys

UNITED STATES PATENT OFFICE.

CHARLES W. RUSSELL AND NEIL CLIFFORD, OF NEW YORK, N. Y.

IMPROVEMENT IN LAMPS.

Specification forming part of Letters Patent No. 72,683, dated December 24, 1867.

*To all whom it may concern:*

Be it known that we, CHARLES W. RUSSELL and NEIL CLIFFORD, of the city, county, and State of New York, have invented a new and Improved Lamp-Burner; and we do hereby declare that the following is a full, clear, and exact description thereof, which will enable others skilled in the art to make and use the same, reference being had to the accompanying drawings, forming a part of this specification.

This invention relates to a new and improved lamp-burner designed for burning coal-oil and other similar volatile hydrocarbons.

The invention consists in a novel form or shape of draft-chimney, in connection with a cone or deflector, arranged in such relation with each other that the flame of the burner will be supplied with a requisite amount of oxygen to support combustion and produce a brilliant illuminating-flame.

In the accompanying sheet of drawings, Figure 1 is a vertical central section of my invention, taken in the line $x\ x$, Fig. 2, and Fig. 2 a horizontal section of the same, taken in the line $y\ y$, Fig. 1.

Similar letters of reference indicate corresponding parts.

A represents the burner, which is screwed into the top of the lamp, as usual. The burner is supplied with the ordinary flat wick-tube, and with a cone or deflector, B, which may be constructed of glass or metal, or both materials combined. In Fig. 1 it is shown with a metal tip, $a$, having metal supports $b$ and a cylindrical glass side, $c$. The cone or deflector rests upon the bottom of the burner, and air is allowed to pass into its lower end through openings $d$.

C is a glass draft-chimney, which is of peculiar shape, the lower part, $e$, being of cylindrical form, and extending upward about to a level with the top of the glass side $c$ of the cone. The chimney then suddenly contracts in diameter, so as to form a deflector, $f$, directly over the space $g$ between the chimney and cone, as clearly shown in Fig. 1, air being admitted into the space $g$ through openings $h$ in the bottom of the burners, and thrown or cast upon the flame above the cone, as indicated by the arrows 1, while the air is admitted to the base of the flame within the cone, as indicated by the arrows 2.

By this arrangement a brilliant illuminating-flame is obtained, and the invention possesses the advantage of having the lower cylindrical part of the draft-chimney cool at all times, so that it may be adjusted on the burner and removed therefrom at any time without any difficulty whatever.

Having thus described our invention, we claim as new and desire to secure by Letters Patent—

The deflector B, when its cap $a$, supported upon metal strip $b$, is surrounded by the supplemental glass cylinder $c$, having a contracted top, and resting upon the burner A between the rows of perforations $d\ h$, said cylinder being also surrounded by the base $e$ of the chimney C, as herein described, for the purpose specified.

The above specification of our invention signed by us this 15th day of March, 1867.

CHAS. W. RUSSELL.
NEIL CLIFFORD.

Witnesses:
WM. F. MCNAMARA,
ALEX. F. ROBERTS.